United States Patent [19]

Withoff et al.

[11] 4,055,205
[45] Oct. 25, 1977

[54] PRESS SEAL

[75] Inventors: Alfred J. Withoff; David C. Schultz, both of Grand Rapids, Minn.

[73] Assignee: Blandin Wood Products, Grand Rapids, Minn.

[21] Appl. No.: 705,762

[22] Filed: July 16, 1976

[51] Int. Cl.[2] .......................... B27D 3/00; F02F 5/00; B30B 1/23
[52] U.S. Cl. .......................... 144/281 R; 100/269 B; 277/152; 277/212 F; 277/229; 425/406
[58] Field of Search .......... 144/281 R, 281 A, 281 C, 144/283; 425/406; 277/229, 230, 212 F, 212 R, 152; 100/199, 269

[56] References Cited

U.S. PATENT DOCUMENTS

| | | | |
|---|---|---|---|
| 2,480,116 | 8/1949 | Brummer | 277/152 |
| 2,554,622 | 5/1951 | Jones | 277/212 F X |
| 2,597,976 | 5/1952 | Cousins | 277/229 X |
| 2,765,023 | 10/1956 | Fagg et al. | 277/212 F |
| 2,875,797 | 3/1959 | Clark | 100/269 R X |

*Primary Examiner*—Othell M. Simpson
*Assistant Examiner*—W. D. Bray
*Attorney, Agent, or Firm*—Norman P. Friederichs

[57] ABSTRACT

An elastomeric seal suitable for use in sealing non-circular cylinders of hydraulic presses against loss of the working fluid. This seal is an elastomeric (e.g. rubber) seal having a generally L-shaped cross section. One portion of the seal functions as a support portion and includes longitudinally extending ribs along its inner face for engaging in a sealed relationship with a supporting structure. The other portion of the seal acts as a wiping portion in engagement with the moving cylinder. The wiping and support portions come together in a generally perpendicular relationship to form a rounded nose where their outer faces meet and a reinforcing fabric is formed into the seal along its outer surface and extending across the nose of the seal.

7 Claims, 4 Drawing Figures

PRESS SEAL

BACKGROUND OF THE INVENTION

Hydraulic molding presses are well-known and have been used for a variety of purposes including the hot pressing of adhesive or resin coated fibers, chips or sheets of wood, paper and the like to form boards, panels, plywood and other products of a similar nature.

The manufacture of wafer board panels from wood wafers and a heat curable resin is one such illustration. Numerous patents exist which refer to the manufacture of wafer board panels including patents to such inventors as James d'A. Clark and Robert Lambert. A useful description of the entire process is shown in U.S. Pat. No. 3,899,559.

Although early efforts at making panels such as plywood and wafer board in hydraulic molding presses involve the use of relatively small presses of conventional design, economic realities have dictated the use of larger and larger presses. As the size of the presses has increased, concern has been generated over the ability of presses of conventional design using circular pistons to achieve uniform pressing and proper thickness control.

In an effort to improve the operation of such processes, a hydraulic molding press was devised using an extremely large non-circular piston of approximately the same dimensions as the lower platen of the hydraulic press. This development is described in U.S. Pat. No. 2,875,797.

The use of a hydraulic molding press having a non-circular piston of substantially the same size and substantially the same dimensions as the lower press platen offers certain advantages in quality control with regard to the product (e.g. wafer board) being produced. On the other hand, such presses must have an effective seal surrounding the non-circular piston for preventing loss of the working fluid (e.g. water). Conventional seals intended for circular pistons have not proven suitable and special seals have been developed, largely on a trial and error basis.

Seal problems seem to have become more difficult as the size of the non-circular piston has been increased. For example, one single, non-circular piston press which is now in operation in the U.S.A. in the production of wafer board is approximately 8 feet wide by 28 feet long.

Since changing a seal on a press of this size is a time consuming task and involves a complete shutdown of manufacturing operations, there has been substantial incentive to develop seals capable of operating for extended periods of time without replacement.

SUMMARY OF THE INVENTION

The present invention is an improved elastomeric seal.

Briefly described, the improved seals of this invention are elastomeric (e.g. tire rubber or the equivalent) seals having a generally L-shaped cross section. One arm or leg of the L-shaped cross section functions as a support portion of the seal and the other leg functions as a wiping portion. The support portion is provided with a series of longitudinally spaced perforations for receiving means such as bolts for clamping the seal in an operating position. The inner face of the support portion of the seal is further provided with longitudinally extending ribs which embrace the perforations to thereby engage in a sealed relationship with a supporting structure when the seal is clamped in place. The wiping portion of the seal is intended to come into sliding contact with the moving press piston. The wiping portion and the support portion of the seal are joined together in a generally perpendicular relationship to thereby form a rounded nose where the outer faces of these two portions meet. A reinforcing fabric is formed into the seal along its outer surface and extending across the nose of the seal.

THE DRAWINGS

DETAILED DESCRIPTION

Figure 1:
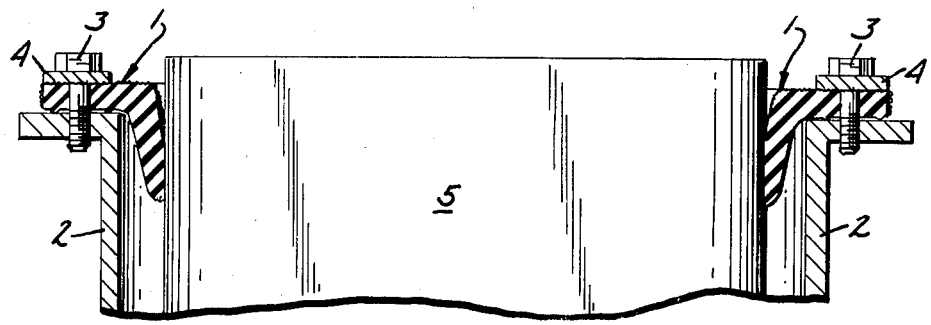
FIG. 1 is a fragmentary cross-sectional view of a hydraulic molding press showing a seal which has been clamped into place for sealing or wiping engagement with a moving piston.
Figure 2:
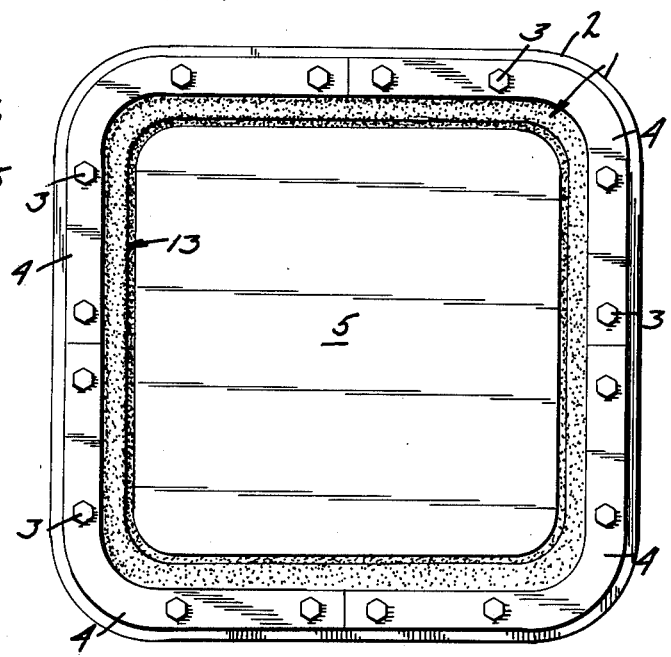
FIG. 2 is a fragmentary top view of the press and seal arrangement shown in FIG. 1.

The installation and arrangement of press seals are shown in FIGS. 1 and 2 in which a press seal generally designated by the numeral 1 is clamped to a supporting frame member 2 by bolts 3 which pass through a metal hold-down plate 4 through a perforation in seal 1 into threaded engagement with support member 2. The seal 1 thus surrounds piston 5 which is mounted for reciprocal movement in a vertical direction. The seals thus prevents the working fluid from escaping through the space between support member 2 and piston 5.

This arrangement is shown more fully in FIG. 2 in which the non-circular nature of hydraulic press piston 5 can be seen.

Figure 3:
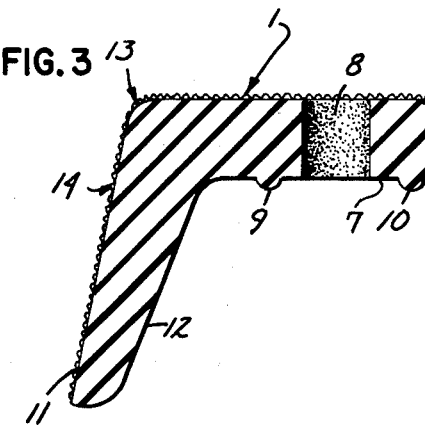
FIG. 3 is a cross-sectional view of a preferred embodiment of the press seal of this invention.

The details of the present improved seal are more fully shown in FIG. 3. FIG. 3 is a cross section of the improved seal of this invention. According to FIG. 3, the present seal which is generally designated by the numeral 1 has a generally L-shaped cross section.

For purposes of convenience, the seal 1 of FIG. 3 will be described as though the press piston 5 would always be mounted for movement in a vertical direction and powered from below.

As shown in FIG. 3, the generally horizontal leg of seal 1 is the support portion of the seal. The support portion has an upper face 6 and a lower face 7. The support portion of seal 1 is provided with a series of longitudinally spaced perforations 8 for receiving means such as bolts (e.g. bolt 3 of FIG. 1) for clamping seal 1 into a sealed operating position against a support member (e.g. support member 2 of FIG. 1). Along the lower face 7 of the support portion of seal 1 are two longitudinally extending ribs (9 and 10) which embrace perforations 8 and which engage a support structure (e.g. support 2 of FIG. 1) when the seal 1 is clamped into operating position.

As shown in FIGS. 2 and 3, the vertical leg of seal 1 forms a wiping portion of the seal and includes an outer face 11 and an inner face 12.

The support portion of seal 1 and the wiping portion of seal 1 come together in a generally perpendicular relationship to form a rounded nose 13 where their outer faces 11 and 12 meet.

A reinforcing fabric generally designated by the numeral 14 is formed into the outer surface of seal 1 and extends across the nose 13 of seal 1. Reinforcing fabric 14 need not extend completely across the outer face of seal 1 as shown in FIG. 3, although such is preferred. In general, it is sufficient if the fabric extends across nose 13 and covers at least 50 percent of surface 11 and at least a portion of surface 6. Desirably, the reinforcing fabric 14 will cover a sufficient portion of surface 6 to surround perforations 8, and may even extend down the rear face 5 of the support portion of seal 1.

The seal 1 will be molded or otherwise formed from an elastomeric material. Automobile tire compositions and their equivalent (natural and synthetic rubbers) are particularly preferred.

The reinforcing fabric 14 which is formed or embedded or bonded into or onto the surface of seal 1 and which forms an integral part thereof, can be any suitable reinforcing fabric. Fabrics of the type used to reinforce automotive tires are particularly well-suited for this purpose. In particular, woven fabrics made of synthetic polymeric materials (e.g. nylon) are particularly preferred because of their wear resistance and temperature stability, as well as their resistance to water and oils.

It is especially desirable for nose 13 of seal 1 to be rounded rather than angular since the rounding seems to prevent galling of the seal during use. A suitable radius for nose 13 is one-eight inch or greater.

Figure 4:
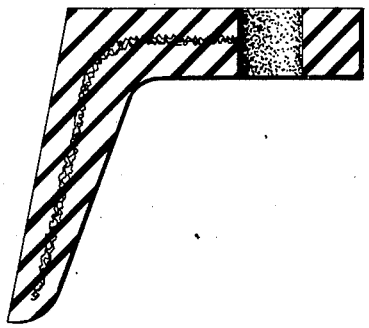
FIG. 4 is a cross-sectional view of one prior art press seal having an unacceptable useful life.

In FIG. 4 is shown one of the earlier designs of a press seal for use with a hydraulic molding press having a large non-circular piston. As shown in FIG. 4, this seal included a reinforcing fabric which was embedded well within the body of the seal. The nose of the seal was angular rather than rounded to any significant degree and the lower face of the support portion was devoid of any sealing ribs of the type shown in FIG. 3. When a seal of this general construction was used on a large press (a heated press having a lower platen of approximately 8 feet by 28 feet), the useful life of the seal was on the order of several months of press operation as contrasted to the seal shown in FIGS. 3 which has successfully functioned for more than 8 months of press operation.

What is claimed is:

1. An elastomeric seal having a generally L-shaped cross section including a support portion and a wiping portion; said support portion having a series of longitudinally spaced perforations for receiving means for clamping said seal in an operating position; said support portion further having longitudinally extending ribs along its inner face embracing said perforations for engaging in a sealed relationship with a supporting structure; said wiping portion and said support portion coming together in a generally perpendicular relationship to form a rounded nose where their outer faces meet; and a reinforcing fabric formed into said seal along its outer surface and extending across the nose of the seal.

2. Seals of claim 1 in which the reinforcing fabric extends over at least 50 percent of the total area of the outer faces of the support and wiping portions of said seal.

3. Seals of claim 2 in which the fabric is nylon and the seal is made of tire rubber.

4. Seals of claim 3 in which the seals are generally rectangular in shape with at least one of the sides of the rectangle being at least about 8 feet in length.

5. A hydraulic molding press having a non-circular cylinder or ram powered by a working fluid under pressure, said cylinder being sealed against loss of working fluid with an elastomeric seal having a generally L-shaped cross-section including a support portion and a wiping portion; said support portion having a series of longitudinally spaced perforations for receiving means for clamping said seal in an operation position; said support portion further having longitudinally extending ribs along its inner face embracing said perforations for engaging in a sealed relationship with a supporting structure; said wiping portion and said support portion coming together in a generally perpendicular relationship to form a rounded nose where their outer faces meet; and a reinforcing fabric formed into said seal along its outer surface and extending across the nose of the seal.

6. A hydraulic molding press having a non-circular cylinder or ram powered by a working fluid under pressure, said cylinder being sealed against loss of working fluid with an elastomeric seal having a generally L-shaped cross section including a support portion and a wiping portion; said support portion having a series of longitudinally spaced perforations for receiving means for clamping said seal in an operating position; said support portion further having longitudinally extending ribs along its inner face embracing said perforations for engaging in a sealed relationship with a supporting structure; said wiping portion and said support portion coming together in a generally perpendicular relationship to form a rounded nose where their outer faces meet; and a reinforcing fabric formed into said seal along its outer surface and extending across the nose of the seal; said seal being generally rectangular in shape with at least one of the sides of the rectangle being at least about 8 feet in length.

7. Presses of claim 6 in which the working fluid is water, with or without additives.

* * * * *